US009007493B2

United States Patent
Moon et al.

(10) Patent No.: US 9,007,493 B2
(45) Date of Patent: Apr. 14, 2015

(54) IMAGE PROCESSING APPARATUS AND IMAGE PROCESSING METHOD FOR THE SAME

(71) Applicant: LG Innotek Co., Ltd., Seoul (KR)

(72) Inventors: Young Seop Moon, Seoul (KR); Myung Wook Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 18 days.

(21) Appl. No.: 13/872,642

(22) Filed: Apr. 29, 2013

(65) Prior Publication Data

US 2013/0286253 A1    Oct. 31, 2013

(30) Foreign Application Priority Data

Apr. 27, 2012  (KR) .......................... 10-2012-0044989
Aug. 8, 2012   (KR) .......................... 10-2012-0086888

(51) Int. Cl.
*H04N 5/217*    (2011.01)
*H04N 5/228*    (2006.01)
*H04N 5/235*    (2006.01)
*G06T 5/00*     (2006.01)
*G06T 5/40*     (2006.01)

(52) U.S. Cl.
CPC .............. *H04N 5/2357* (2013.01); *G06T 5/007* (2013.01); *G06T 5/003* (2013.01); *G06T 5/40* (2013.01); *G06T 2207/20012* (2013.01); *G06T 2207/20021* (2013.01)

(58) Field of Classification Search
CPC ...................................................... H04N 5/217
See application file for complete search history.

(56) References Cited

U.S. PATENT DOCUMENTS

| 8,346,010 | B2* | 1/2013 | Ando et al. | ................... 382/275 |
| 2004/0207736 | A1* | 10/2004 | Muramatsu | ................... 348/254 |
| 2005/0093992 | A1* | 5/2005 | Fukumoto | ................. 348/222.1 |
| 2009/0027521 | A1* | 1/2009 | Fukumoto | ..................... 348/241 |
| 2011/0242352 | A1* | 10/2011 | Hikosaka | .................. 348/222.1 |
| 2012/0189032 | A1* | 7/2012 | Ogawa | .......................... 372/101 |
| 2012/0202140 | A1* | 8/2012 | Uno et al. | ......................... 430/5 |

(Continued)

FOREIGN PATENT DOCUMENTS

JP         4326029 B2    6/2009
WO   WO-2010/032409 A1  3/2010

OTHER PUBLICATIONS

Office Action dated Jun. 14, 2013 in Korean Application No. 10-2012-0044989, filed Apr. 27, 2012.

(Continued)

*Primary Examiner* — Lin Ye
*Assistant Examiner* — John H Morehead, III
(74) *Attorney, Agent, or Firm* — Saliwanchik, Lloyd & Eisenschenk

(57) ABSTRACT

Disclosed are an image processing apparatus and an image processing method. The image processing method includes receiving an image, dividing the received image into a plurality of regions in a unit of a frame, acquiring information of brightness of a pixel included in each divided region, detecting a region having a flare among the divided regions by using the acquired brightness information, determining an image processing condition to be applied to the detected region having the flare, and processing the received image based on the determined image processing condition. The image processing condition applied to the region having the flare is different from an image processing condition applied to other regions.

20 Claims, 15 Drawing Sheets

(56) References Cited

U.S. PATENT DOCUMENTS

2012/0224156 A1* 9/2012 Lee et al. .................. 355/52
2014/0104573 A1* 4/2014 Iwanaga .................. 351/206

OTHER PUBLICATIONS

Notice of Allowance dated Aug. 29, 2013 in Korean Application No. 10-2012-0044989, filed Apr. 27, 2012.

* cited by examiner

IMAGE PROCESSING APPARATUS AND IMAGE PROCESSING METHOD FOR THE SAME

CROSS-REFERENCE TO RELATED APPLICATIONS

This application claims the benefit under 35 U.S.C. §119 of Korean Patent Application Nos. 10-2012-0044989, filed Apr. 27, 2012, and 10-2012-0086888, filed Aug. 8, 2012, which are hereby incorporated by reference in their entirety.

BACKGROUND

In general, closed circuit televisions (CCTVs) installed in the indoors or the outdoors of departments, banks, exhibition centers, and factories as well as typical houses have been variously used in order to perform antitheft functions and determine the operating state of machine, the process flow, or the overall situation.

The CCTVs have been installed in a specific place to monitor all situations, which are happened in the place, at a remote plate. To this end, the CCTVs include image transmitters and display units to receive signals transmitted from the image transmitters and supply the signals to display apparatuses.

Meanwhile, generally, a digital camera is similar to a typical camera in that the digital camera employs the structure of the optical mechanism of the typical camera. However, the digital camera makes a difference from the typical camera in that the digital camera receives an image by using a charge coupled device (CCD) image sensor instead of films, and converts image signals into digital data to be stored in a memory in the form of a graphic file.

Through the digital camera, a user can instantly recognize the photographed image through a display screen image. In addition, the user can variously process the image photographed through the digital camera by editing or outputting the image by using a computer. If necessary, the user can print out the image without the complex processes such as film development and printing processes, so that the digital camera has the wide utilization.

FIG. 1 is a schematic view showing a camera according to the related art, and FIG. 2 is a view showing the image state according to the related art. FIG. 3 is a graph showing the state of light according to the related art, and FIG. 4 is a view showing an image photographed by using a camera according to the related art.

Referring to FIG. 1, the camera includes a first lens 1 having at least one surface, to which a diffractive optical element (DOE) is applied, and having a negative refractive power, a second lens 2 having at least one surface, to which the DOE is applied, and having a positive refractive power, an aperture 3 to adjust the quality of light between the first and second lenses 1 and 2, and an optical low pass filter (OLPF) 4 to pass a low frequency band between the second lens 2 and an imaging surface of an image sensor 5 and to cut off a high frequency band equal to or greater than a Nyquist frequency.

However, as shown in FIG. 2, if the lens having the DOE is used, extra light such as zero-order light or secondary light is focused on the imaging surface of the image sensor 5 in addition to primary light allowing an image to be exactly formed on the imaging surface of the image sensor 5. Accordingly, flare may be caused in the image.

In other words, as shown in FIG. 3, the secondary light and the zero-order light are produced about the primary light. As the intensity of the primary light is increased, the intensities of the zero-order light and the secondary light are increased.

In other words, if the lens is manufactured by using the DOE, an image shown in FIG. 4 is expressed. The image has the flare caused around a light source, so that the image quality of the image is degraded.

The flare is caused because the zero-order light and the secondary light are not exactly focused on the imaging surface. If the brightness is reduced in order to reduce the flare, the gray scale of a dark portion of the image is reduced, which serves as another cause to degrade the image quality.

Therefore, a technology of reducing the image flare to inhibit the image quality from being degraded is required.

BRIEF SUMMARY

The embodiment provides a camera, which can effectively inhibit a flare phenomenon caused by zero-order light or secondary light when the camera employs a diffractive optical element, and an image processing method thereof.

In addition, the embodiment provides a camera, which can detect a region having a flare by analyzing a photographed image and perform image processing with respect to only the detected region, and an image processing method thereof.

Further, the embodiment provides a camera, which can reconstructing an original image before a flare is caused by dividing an image into predetermined regions and applying different point spread functions to the divided regions, and an image processing method thereof.

Meanwhile, the embodiments are not limited to the above object, and those skilled in the art can clearly understand other objects from following description.

According to the embodiment, there is provided an image processing method of an image processing apparatus. The image processing method includes receiving an image, dividing the received image into a plurality of regions in a unit of a frame, acquiring information of brightness of a pixel included in each divided region, detecting a region having a flare among the divided regions by using the acquired brightness information, determining an image processing condition to be applied to the detected region having the flare, and processing the received image based on the determined image processing condition. The image processing condition applied to the region having the flare is different from an image processing condition applied to other regions.

According to the embodiment, there is provided an image processing apparatus including a lens, an image sensor to convert a light input through the lens into an electrical image, and an image processing unit to divide the converted image through the image sensor into a plurality of regions, to detect a flare region from the divided regions by using brightness information of each divided region, and to perform image processing with respect to the flare region and other regions by applying different image processing conditions to the flare region and the other regions.

As described above, according to the embodiment, the region having the flare is detected by analyzing the image and image processing for the detected region is performed, so that the flare caused by zero-order light or secondary light in the camera employing the DOE can be effectively inhibited.

In addition, according to the embodiment, the image processing condition of only the region having the flare is changed, so that the image quality of the region having the flare can be improved without degrading the image quality of the region without the flare.

According to the embodiment, the regions having the flare are detected by analyzing the image, and different point spread functions are applied to the regions having the flare to remove the flare from the regions, thereby reconstructing an original image without degrading the image quality of the image.

DETAILED DESCRIPTION

Hereinafter, exemplary embodiments will be described in detail with reference to accompanying drawings.

Figure 1:
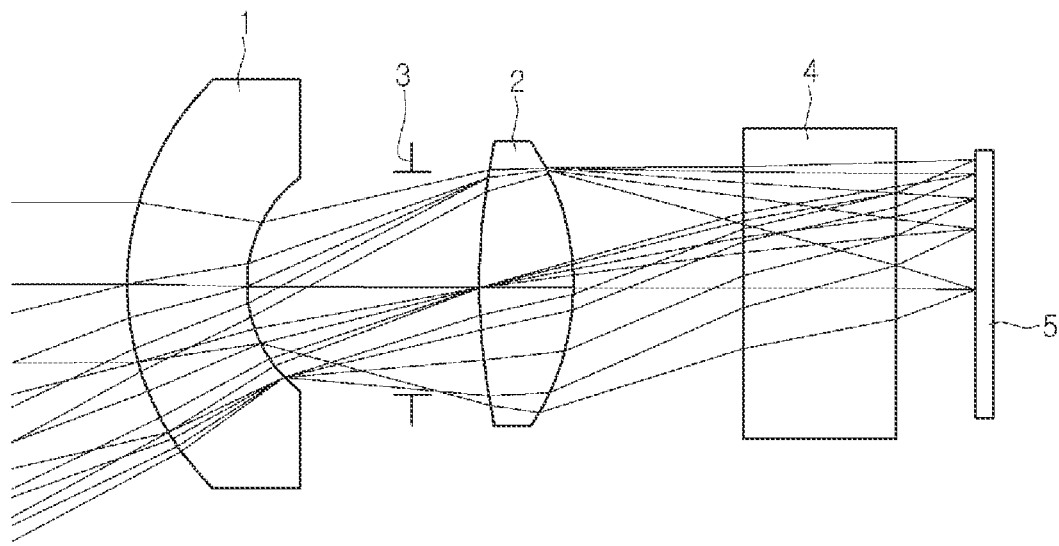
FIG. 1 is a schematic view showing a camera according to the related art.
Figure 2:
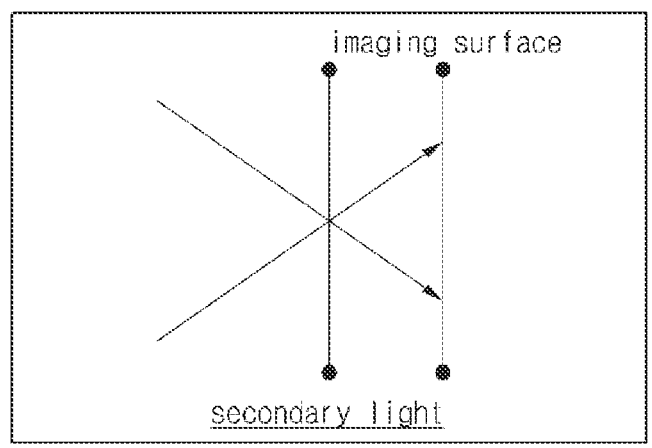
FIG. 2 is a view showing the image state according to the related art.
Figure 2:
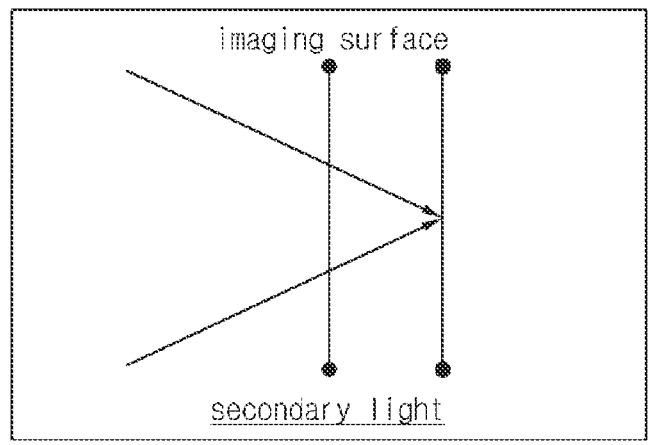
Figure 3:
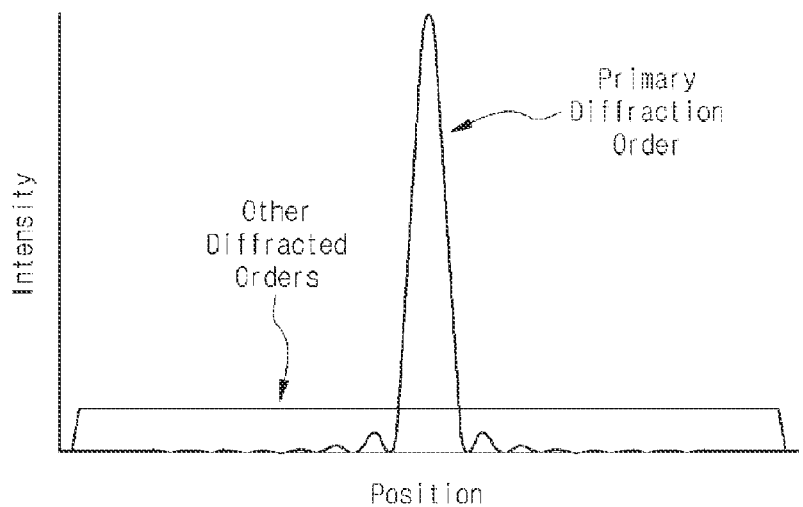
FIG. 3 is a graph showing the state of light according to the related art.
Figure 4:
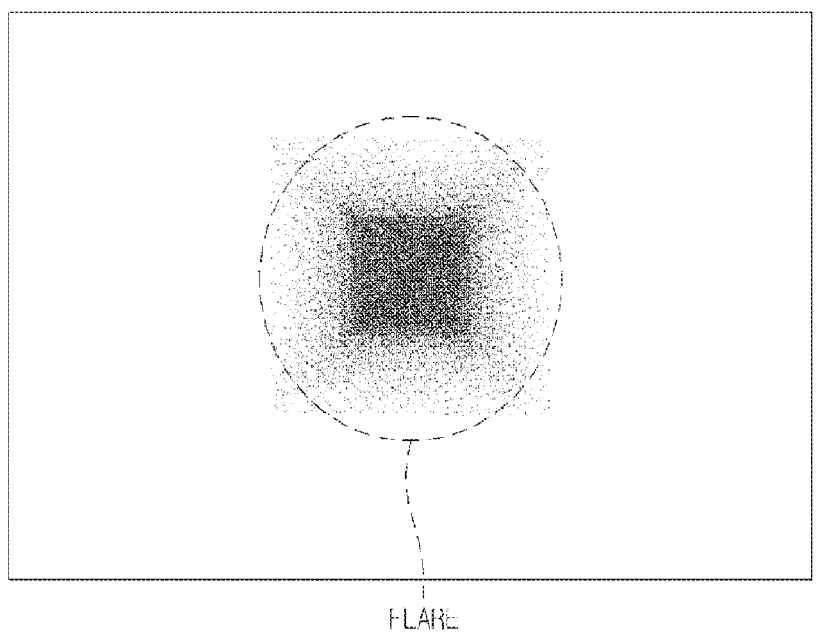
FIG. 4 is a view showing an image photographed by using a camera according to the related art.
Figure 5:
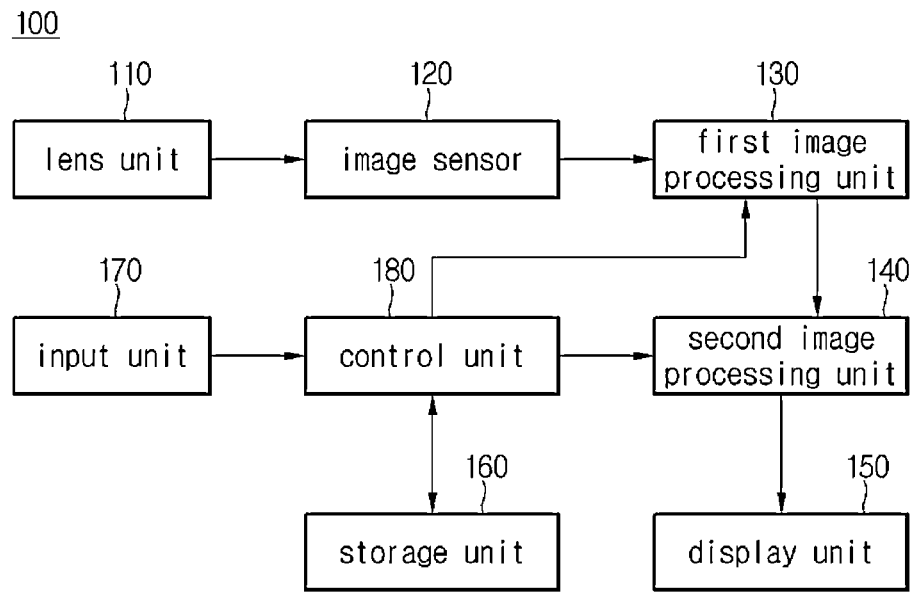
FIG. 5 is a view showing an image processing apparatus according to the embodiment.

FIG. 5 is a view showing an image processing apparatus 100 according to the embodiment.

Referring to FIG. 5, the image processing apparatus 100 includes a lens unit 110, an image sensor 120, a first image processing unit 130, a second image processing unit 140, a display unit 150, a storage unit 160, an input unit 170, and a control unit 180.

The lens unit 110 serves as an optical system (OPS), and may include a filter. The lens unit 110 optically processes the light of a photographed image. The lens unit 110 allows an optical image of a subject to be formed on the image sensor 120.

The lens unit 110 may include a zoom lens (not shown) and a focus lens (not shown) movable in an optical axis direction in order to optically adjust a focus onto the image sensor 120.

In other words, the lens unit 110 acquires an image for a subject photographed by a user.

In more detail, the lens unit 110 may include a first lens group including a concave lens having at least one surface including a diffractive optical element (DOE) and a second lens group including a convex lens having at least one surface including a DOE.

The first lens group includes a concave lens having negative (−) power so that the concave lens has a wide viewing angle and a sufficiently long back focal length (BFL). In addition, the first lens group has one aspheric surface and at least one surface designed with a DOE. Since the diffraction of the surface having the DOE has a negative sign, the chromatic aberration on an optical axis can be easily corrected, and the shape of the lens can be gradually formed by covering a portion of the power.

In addition, the second lens group having the convex lens has positive power, at least one aspheric surface, and at least one surface having the DOE, so that the image information acquired from the first lens group having the shape of the concave lens is converged.

The image sensor 120 may include a complementary metal-oxide semiconductor (CMOS) or a charge coupled device (CCD).

The image sensor 120 has a structure in which a plurality of photo-detectors are integrated with each other while forming pixels. The image sensor 120 converts the image information of the subject into electrical data to be output.

In other words, the image sensor 120 detects the image of the subject passing through the lens unit 110. The detected image may be transmitted to a user at a remote plate.

The image sensor 120 accumulates the quantity of light input through the lens unit 110, and outputs the image taken by the lens unit 110 according to the accumulated quantity of the light in response to a vertical synchronization signal.

The image is acquired by the image sensor 120 to convert the light reflected from the subject into the electrical signal.

In order to acquire a color image by using the image sensor 120, color filters are required, and a filter (not shown), which is called a color filter array (CFA), has been employed. The CFA passes only a light representing one color for each pixel, and has a regularly-arrayed structure. The CFA may have various forms according to the array structure.

The first image processing unit 130 analyzes the image acquired by the image sensor 120 in the unit of a frame. The first image processing unit 130 compensates for the image quality of the image according to the analyzing result and outputs the image.

In more detail, the first image processing unit 130 checks a flare region in the image acquired by the image sensor 120. In addition, the first image processing unit 130 changes an image processing condition of the checked flare region to compensate for the image quality of flare region.

In this case, the first image processing unit 130 may compensate for the image quality of the flare region through an image quality compensating scheme according to the first embodiment. In addition, the first image processing unit 130 may compensate for the image quality of the flare region through an image quality compensating scheme according to the second embodiment.

Hereinafter, the image quality compensating schemes according to the first and second embodiments will be described in more detail.

The second image processing unit 140 may be called an image signal processor (ISP), and processes an image signal, which is output through the first image processing unit 130, in the unit of a frame.

The display unit 150 displays an image taken according to the control of the control unit 180 to be described. The display unit 150 displays a screen image for settings required when the image is taken or a screen image for the operation selection of the user.

In addition, according to the embodiment, the display unit 150 displays a pre-view screen image when a pre-view key is input. In addition, when a shooting key is input, the display unit 150 displays a pop-up screen image, a preset animation or a preset image.

The storage unit 160 stores data required to operate the image processing apparatus 100.

In addition, the storage unit 160 according to the embodiment stores the pop-up screen image, the preset animation or the preset image to be displayed through the display unit 150.

The storage unit 160 may include at least one among a flash memory type storage medium, a hard disk type storage medium, a multimedia card micro-type storage medium, a card type memory (e.g., SD memory or XD memory), a RAM, and a ROM (e.g., EEPROM).

The input unit 170 receives the input of the user and transmits the input of the user to the control unit 180.

If the display unit 150 is realized by using a touch screen, the display unit 150 may act as the input unit 170.

According to the embodiment, the input unit 170 may further include the shooting key for photographing and the pre-view key used to display a pre-view screen image.

The control unit 180 controls the components of the camera.

According to the embodiment, the control unit 180 controls the first image processing unit 130 so that the image quality can be compensated by the first image processing unit 130. Accordingly, an image without flare can be displayed on the display unit 150 through the compensation of the image quality.

Figure 6:
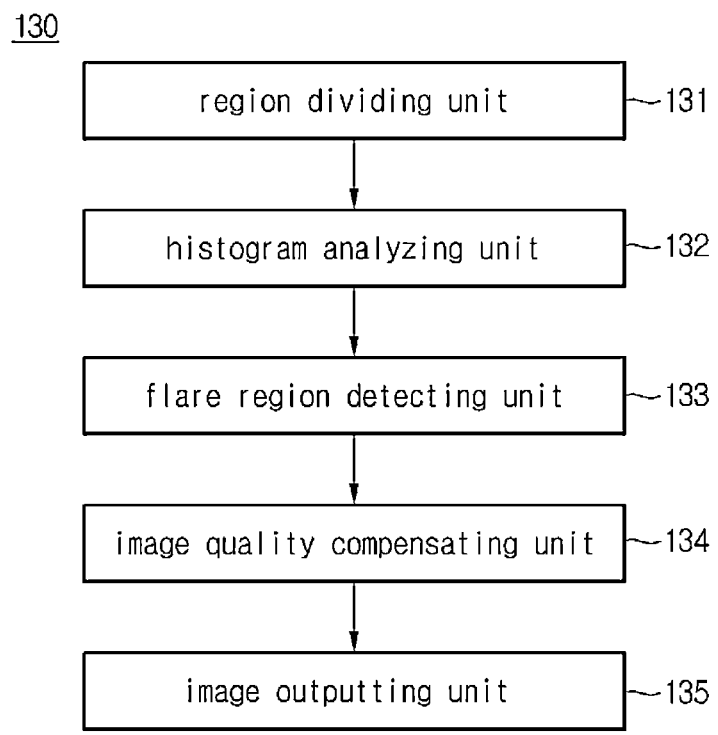
FIG. 6 is a detailed block diagram showing a first image processing unit shown in FIG. 5.

FIG. 6 is a detailed block diagram showing the first image processing unit 130 shown in FIG. 5.

Referring to FIG. 6, the first image processing unit 130 includes a region dividing unit 131, a histogram analyzing unit 132, a flare region detecting unit 133, an image quality compensating unit 134, and an image outputting unit 135.

Hereinafter, the operation of the first image processing unit 130 according to the embodiment will be described.

The first and second embodiments to be described below have the same image processing object of removing flare, but make a difference from each other in a scheme of detecting a flare region to be image-processed and an image processing condition for the detected flare region.

In other words, according to the first embodiment, the flare is removed by changing the image processing condition including a gamma curve, a gain value, and an offset value. However, according to the second embodiment, the flare is removed by changing the image processing condition including a point spread function.

Hereinafter, the first and second embodiments will be described in more detail.

First Embodiment

The region dividing unit 131 receives the image output through the image sensor 120 and outputs the received image in the unit of a frame.

In this case, the region dividing unit 131 divides the frame-unit image into a plurality of regions.

The number of the divided image regions may be varied according to embodiments. In this case, if the number of the divided image regions is increased, the computation amount according to the number of the divided image regions may be increased, but the image quality can be more exactly compensated.

Figure 7:
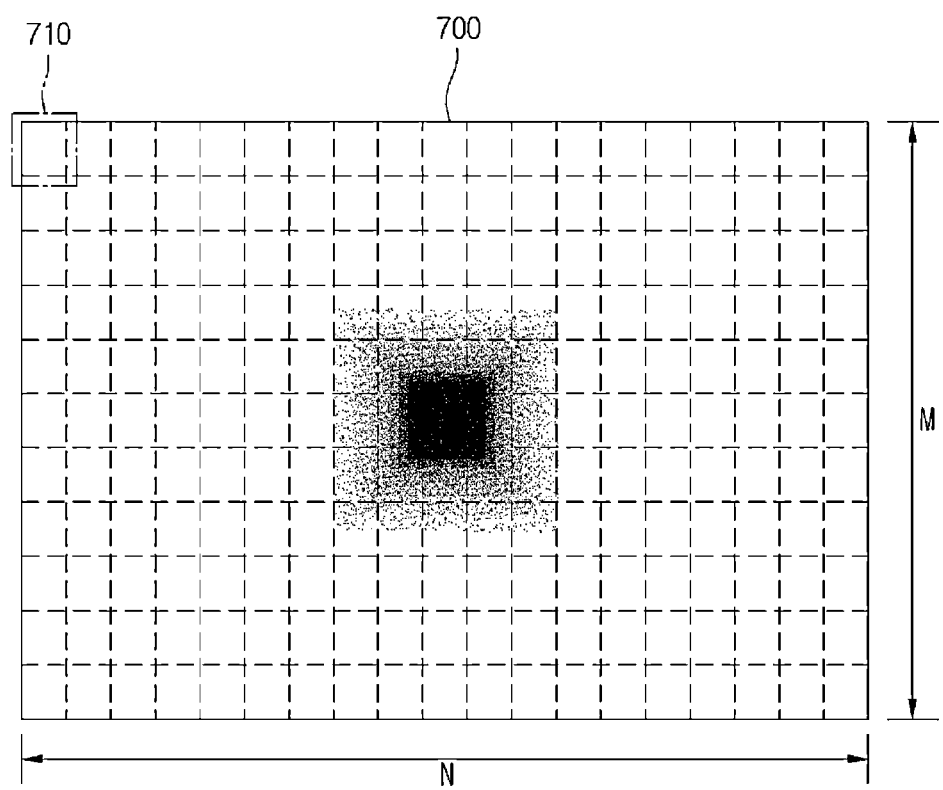
FIG. 7 is a view showing images divided by a region dividing unit according to the first embodiment.

FIG. 7 is a view showing images divided by the region dividing unit 131 according to the first embodiment.

As shown in FIG. 7, the region dividing unit 131 divides an input frame-unit image 700 into N×M regions 710 to be output.

The histogram analyzing unit 132 receives images output through the region dividing unit 131 to analyze the histogram characteristic of each region divided through the region dividing unit 131.

In this case, the histogram characteristic includes the number of frequencies, a peak number, a peak distance, and a peak width. In general, histograms represent the distribution of contrast values of pixels within an image. In other words, the histograms represent the range of bright and dark pixel values when bright and dark pixels are distributed in the image. The histograms represented through a graph are called "histogram graph". For example, contrast values range from 0 to 255 in an image having 256 gray levels. Each contrast value (the number of frequencies of each level) is represented as the height of a graph. The histogram represents a great amount of information of the image, so that the histogram is used in various image processing schemes.

In addition, according to the exemplary embodiment, the characteristic of the image can be recognized by analyzing the histogram.

The flare region detecting unit 133 detects the flare region by using the characteristic of each region analyzed in the histogram analyzing unit 132.

Figure 8:
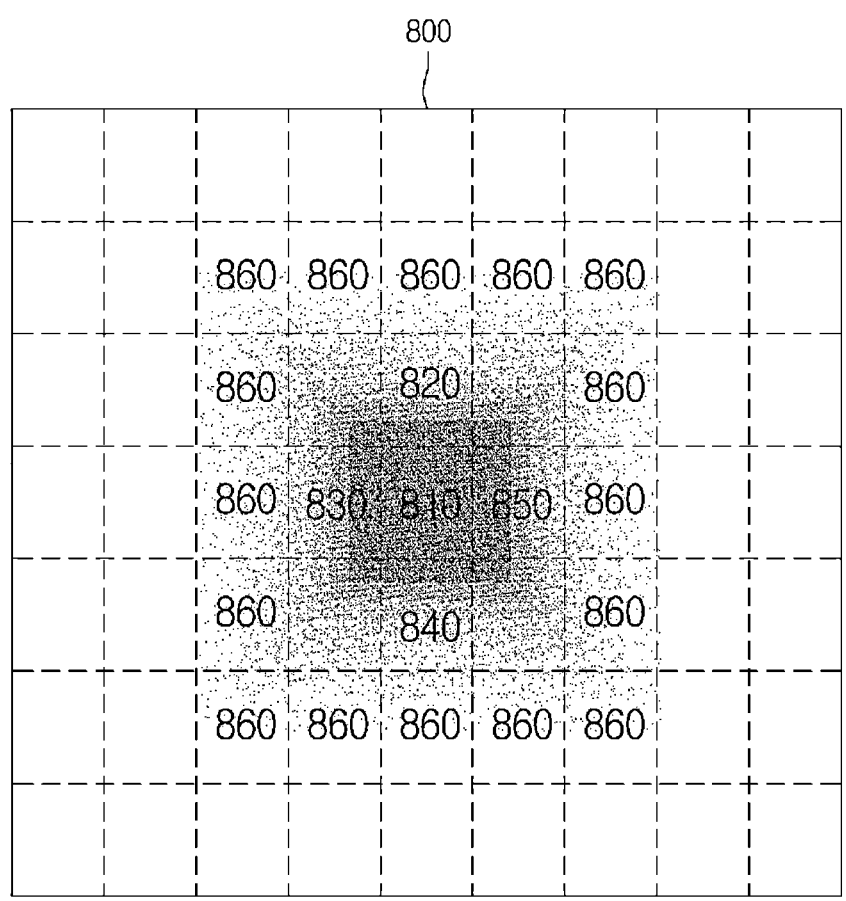
FIG. 8 is a view showing a process of detecting the flare region according to the first embodiment.

FIG. 8 is a view showing a process of detecting the flare region according to the embodiment.

Referring to FIG. 8, the flare region detecting unit 133 checks flare with respect to a first region 810 among the divided regions.

In other words, the flare region detecting unit 133 checks a level value of the brightest pixel among pixels included in the first region 810 and the number of pixels representing the maximum brightness value (the level of 255) among the pixels included in the first region 810.

In this case, if the number of the pixels representing the maximum brightness value is greater than or equal to a preset reference value, the flare region detecting unit 133 determines the first region 810 as a flare region in which flare occurs.

In other words, the flare region detecting unit 133 determines the region, in which the number of pixels in the region representing the maximum brightness value (the level of 255) is equal to or greater than the preset reference value, as the flare region.

The preset reference value for the determination of the flare region may have various values according to the embodiments. For example, it is necessary to distinguish the case in which the original brightness value of an image is the maximum brightness value (the level of 255) from the case in which the image quality is degraded due to the flare, so that the brightness value of the image is the maximum brightness value (the level of 255). In other words, when a pixel included in a specific region has the maximum brightness value, it is necessary to determine if the pixel originally has the maximum brightness value, or has the maximum brightness value caused by the flare.

In this case, the determination may be made based on the continuity of pixels representing the maximum brightness value.

For example, the reference value may be preset to 100. Accordingly, if at least 100 pixels representing the maximum brightness value (the level of 255) are continuously provided in the specific region, the image quality of the region is determined as degraded due to the flare.

In addition, if less than 100 pixels representing the maximum brightness value are continuously provided in a specific region, the specific region is regarded as originally representing the maximum brightness value (the level of 255). The scheme is realized on the assumption that an object representing the original brightness value of 255 and continuously having at least 100 pixels representing the maximum brightness value (the level of 255) rarely exists.

If the first region 810 is the flare region, the flare region detecting unit 133 analyzes regions adjacent to the first region 810 and checks the brightness state of the adjacent region.

The adjacent regions may include a second region 820, a third region 830, a fourth region 840, and a fifth region 850 that are adjacent to the first region 810 at the top, the left, the bottom, and the right of the first region 810, respectively.

Accordingly, the flare region detecting unit 133 checks the states of the adjacent regions 820, 830, 840, and 850 by using the level value of the brightest pixel and the number of pixels representing the maximum brightness value (the level of 255).

In this case, if the adjacent regions are regarded as the flare regions, the flare region detecting unit 133 may regard the first region 810 as being located at the central portion of the whole flare regions.

In other words, if the flare occurs in the first region 810, and a flare image is an image fully representing white (like the center of the sun), the first region 810 may be determined as being located at the central portion of the whole flare regions. In this case, the first region may be determined as an image of an object (e.g., light bulb) causing the flare.

However, the flare region detecting unit 133 detects an edge region from the whole flare regions by taking into consideration the case in which an adjacent region to a predetermined region is not a flare region, and the predetermined region is the flare region.

For example, if the flare degree of a region A is weak (for example, the number of pixels representing the maximum brightness value is 60% of the number of total pixels), the flare degree of a specific region adjacent to the region A is strong (for example, the number of pixels representing the maximum brightness value is 60% of the number of total pixels), and the flare does not occur in another region (e.g., a region next to the region A or a region under the region A) adjacent to the region A, the region A may be regarded as a region located at the edge of the whole flare regions.

If the edge region 860 is detected through the flare region detecting unit 133, the image quality compensating unit 134 compensates for image quality by changing at least one of the gamma curve, the gain value, and the offset of the edge region 860.

Figure 9:
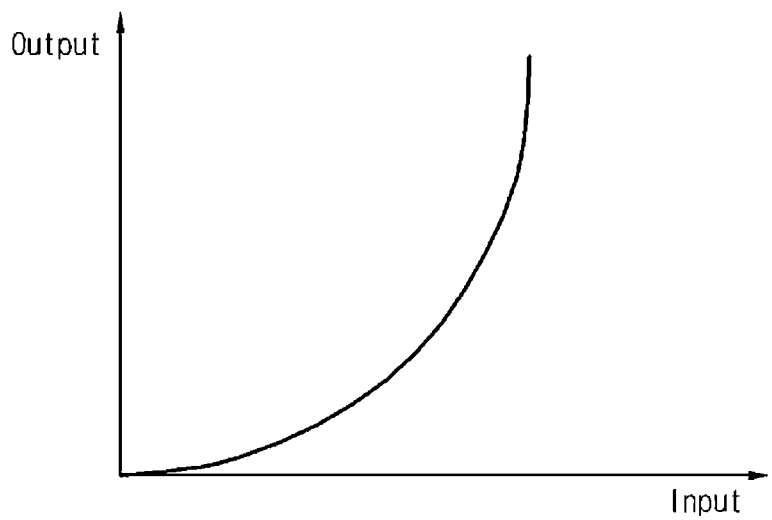
FIG. 9 is a graph showing the variation of the gamma curve according to the first embodiment.
Figure 9:
Figure 9:
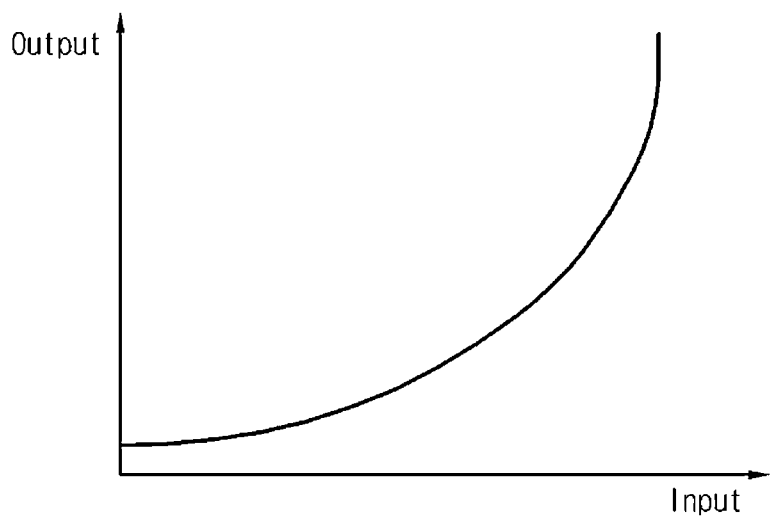

FIG. 9 is a graph showing the variation of the gamma curve according to the first embodiment.

Referring to FIG. 9, the above graph is the graph of the typical gamma curve.

In this case, if the edge region of the flare region is detected, the image quality compensating unit 134 determines a gamma curve applied to the edge region by changing the typical gamma curve.

In other words, to reduce the brightness of the edge region, the gradient of the typical gamma curve is decreased as shown in the graph at the bottom of FIG. 9.

In this case, the decrease degree of the gradient of the gamma curve may be determined according to the flare degree of the edge region.

For example, the gradient of a gamma curve applied to the first edge region (in which the number of pixels representing the maximum brightness value is 50% of the number of total pixels) may be different from the gradient of a gamma curve applied to the second edge region (in which the number of pixels representing the maximum brightness value is 80% of the number of total pixels).

In other words, the gradient of the gamma curve applied to the first edge region may be greater than the gradient of the gamma curve applied to the second edge region. In other words, as the flare degree is increased, the gradient of the applied gamma curve is decreased.

The image outputting unit 135 outputs an image having image quality compensated through the image quality compensating unit 134 in the unit of a frame.

As described above, according to the first embodiment, the edge region of the whole flare regions is checked, and the image quality of the checked edge region is compensated.

Although the central region of the whole flare regions is regarded as a flare region in the above description, the central region actually represents an image of a photographed object such as a light source. Accordingly, only the edge region is preferably determined as a flare region.

Therefore, preferably, the image quality is compensated with respect to only the edge region regarded as the flare region.

Second Embodiment

The region dividing unit 131 receives an image output through the image sensor 120, and divides the received image according to a preset division condition.

The division condition may be varied according to the resolution of the image.

The histogram analyzing unit 132 receives the image divided through the region dividing unit 131, and analyzes the histogram of pixels of each divided region.

In this case, the histogram analyzing unit 132 may determine the brightness level of the pixel in order to analyze the histogram.

In other words, the brightness level may be determined by analyzing the histogram.

The flare region detecting unit 133 detects the flare region based on the brightness level of each divided level determined through the histogram analyzing unit 132.

For example, if the number of the pixels representing the maximum brightness value (the level of 255) exceeds a predetermined range, the flare region detecting unit 133 may determine a related region as a 255-level region. Accordingly, a region adjacent to the 255-level region may be detected as a flare region.

In other words, the 255-level region may refer to the central region of the whole flare regions according to the first embodiment, and the region adjacent to the 255-level region may refer to the edge region according to the first embodiment.

If flare regions are detected, the image quality compensating unit 134 compensates for image quality by applying different point spread functions to the flare regions.

The point spread function to be applied to the flare region is set by the control unit 180, and the details thereof will be described later.

The image outputting unit 135 outputs an image having the image quality compensated through the image quality compensating unit 134.

Figure 10:
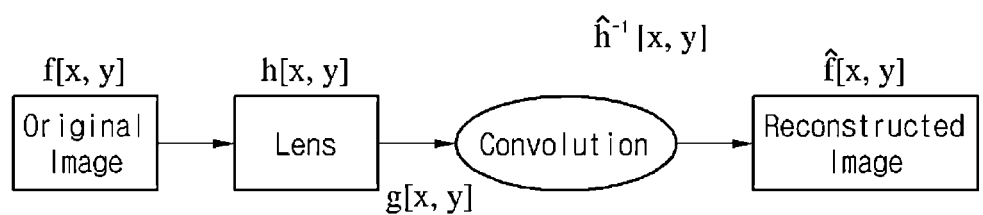
FIG. 10 is a block diagram showing the principle of reconstructing an image according to the second embodiment.

FIG. 10 is a block diagram showing the principle of reconstructing an image according to the second embodiment.

Referring to FIG. 10, if an original image f[x, y] passes through a lens according a specific spread function h[x, y], an image g[x, y] is acquired through photographing.

In this case, if the inverse function $\hat{h}^{-1}[x,y]$ of the point spread function is calculated from the lens and the convolutioin of the inverse function $\hat{h}^{-1}[x, y]$ and the image g[x, y] is performed, the original image may be reconstructed.

In this case, if the convolution is performed before the camera sensor is saturated, the original image may be accurately reconstructed.

However, even if the above convolution is performed after the camera sensor has been saturated, the original image cannot be reconstructed. In other words, since the image sensor is already saturated, another point spread function seems to be applied instead of the point spread function h[x, y]. Accordingly, even if the inverse function ĥ⁻¹[x, y] is applied, the original image cannot be accurately reconstructed. This is because a noise level is increased and the image quality is degraded in the case of the strong light source.

Therefore, according to the embodiment, if the camera sensor is saturated, so that the flare region is caused, a point spread function different from the original point spread function is determined as being applied to the flare region, so that the point spread function applied to the flare region is corrected in order to reconstruct the original image.

Hereinafter, the process of reconstructing the image will be described in more detail with reference to accompanying drawings.

FIGS. 11 to 15 are views showing the process of reconstructing an image according to the second embodiment.

Figure 11:
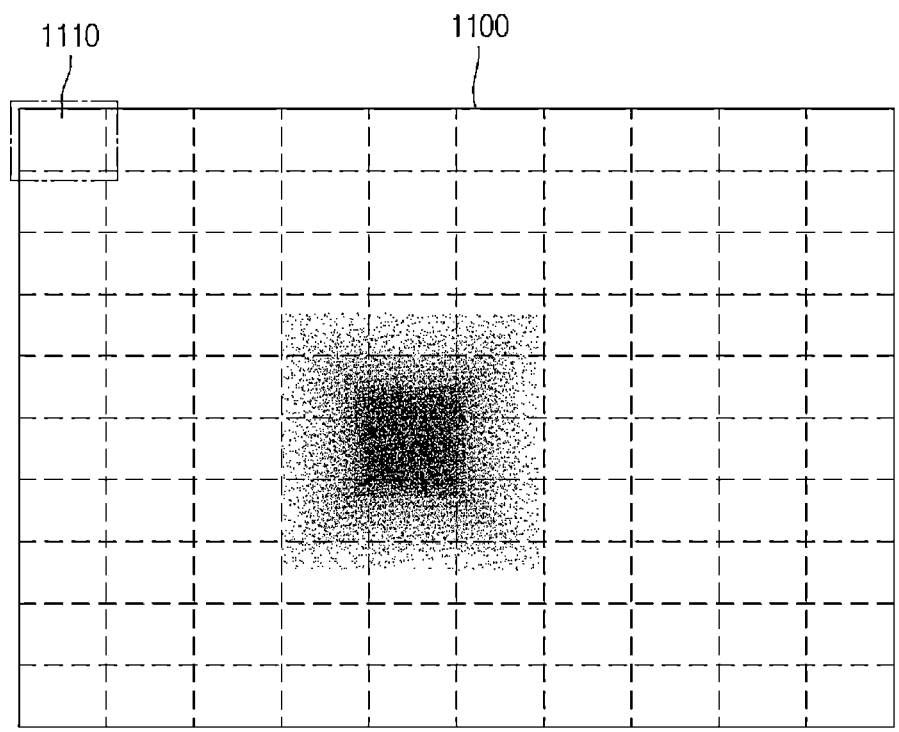
FIGS. 11 to 15 are views showing a process of reconstructing an image according to the second embodiment.

First, referring to FIG. 11, the region dividing unit 131 divides the input image into a plurality of regions according to a preset division condition.

In other words, the region dividing unit 131 divides an input image 1100 into 100 regions having the size equal to that of a first region 1110.

In this case, although the image is divided into 100 regions in FIG. 11, 100 regions are provided only for the illustrative purpose, and the number of divided regions may be more increased or more decreased.

Figure 12:
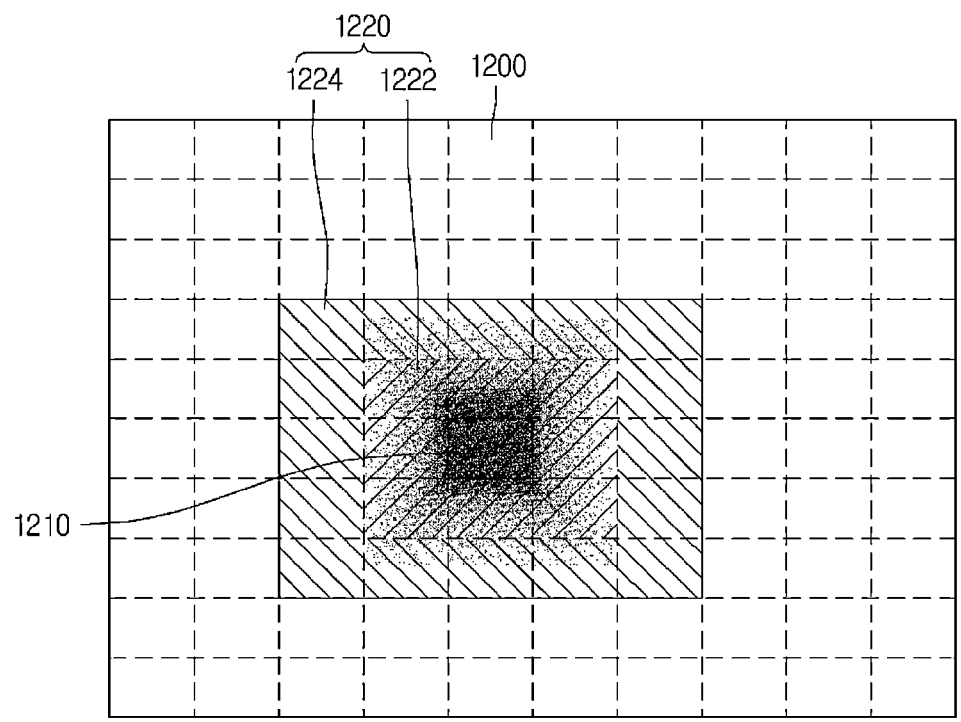

Next, referring to FIG. 12, the histogram analyzing unit 132 determines the brightness level of each pixel with respect to each divided region obtained through the region dividing unit 131.

The brightness level may be determined according to the analysis of the histogram described above.

In addition, the flare region detecting unit 133 receives the information of the brightness level determined through the histogram analyzing unit 132, and determines if a region having the preset number of pixels or more representing the maximum brightness value (the level of 255) exists, based on the information of the determined brightness level.

In addition, if the region representing the maximum brightness value (the level of 255) exists, the flare region detecting unit 133 designates the region as the 255-level region (the central region of the flare region).

As shown in FIG. 12, the number of pixels representing the maximum brightness level (the level of 255) among pixels included in the first region 1210 exceeds the preset reference value. Accordingly, the first region 1210 may be designated as the 255-level region.

Thereafter, if the 255-level region is determined, the flare region detecting unit 133 designates a region 1220 (the edge region in the first embodiment) adjacent to the 255-level region as a flare region.

In this case, the adjacent region 1220 may include up to Ath regions positioned upward, downward, leftward, and rightward from the 255-level region. In addition, although the adjacent region 1220 includes up to 2nd regions upward, downward, leftward, and rightward from the 255-level region in FIG. 12, this is provided only for the illustrative purpose, and the number of regions included in the adjacent region 1220 may be more increased or decreased.

Therefore, the adjacent region 1220 may include a first adjacent region 1222 including first regions upward, downward, leftward, and rightward from the 255-level region, and a second adjacent region 1224 including 2nd regions upward, downward, leftward, and rightward from the 255-level region.

Figure 13:
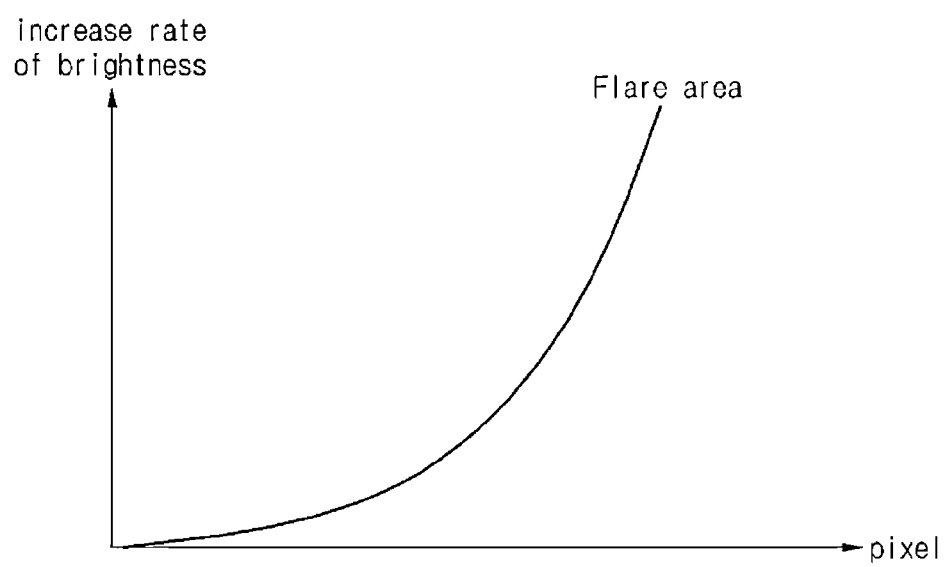
Figure 14:
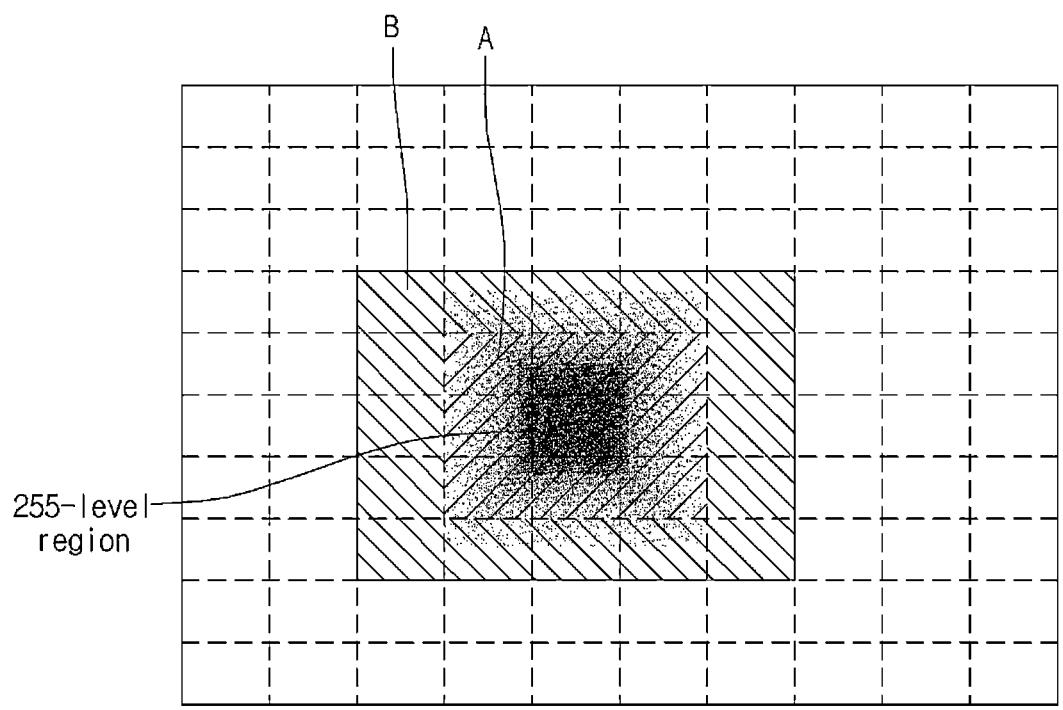

FIG. 13 is a graph showing the increasing rate of the brightness of the adjacent region.

Referring to FIG. 13, regarding the increasing rate of the brightness of each pixel, the slop of the curve is rapidly increased toward the 255-level as shown in FIG. 13.

This represents that the saturation degree of the image is strong and represents the distortion degree of the point spread function is strong.

Therefore, according to the embodiment, since the saturation degree of the image, that is, the distortion degree of the point spread function becomes severe as it approaches the 255-level region, the compensation rate of the point spread function is increased.

For example, since the 255-level region is not distorted, the original point spread function is applied to the 255-level region, and a corrected point spread function, which is obtained by multiplying the original point spread function by predetermined times, is applied to a region adjacent to the 255-level region. In addition, the corrected point spread function is more increased as a predetermined adjacent region is closer to the 255-level region. Accordingly, the corrected point spread function applied to an adjacent region farthest away from the 255-level region may be substantially the same as the original point spread function.

In other words, according to the embodiment, the original point spread function, that is, the reference point spread function is applied to the 255-level region, so that an original image is reconstructed.

In addition, a first corrected point spread function, which is obtained by multiplying the reference point spread function by x times, is applied to the first adjacent region A closest to the 255-level region.

Further, a second corrected point spread function, which is obtained by multiplying the reference point spread function by y times, is applied to a second adjacent region B closest to the 255-level region.

In this case, the x times applied to the first corrected point spread function are greater than the y times applied to the second corrected point spread function. In addition, since the distortion degree of the point spread function becomes severe according to the adjacency degree to the 255-level region, the corrected point spread function is calculated through the higher multiplying.

For example, the reference point spread function may be 1*PSF, the first corrected point spread function may be 5*PSF, and the second corrected point spread function may be 3*PSF.

If the reference point spread function and the corrected point spread function are determined, the image quality compensating unit 134 performs the convolution by employing the inverse functions of the reference point spread functions and the corrected point spread functions, so that an original image without the flare can be reconstructed.

Meanwhile, although the corrected point spread function may be applied based on the above scheme, a region designated as the flare region may be sub-divided in order to remove the flare.

In other words, up to two adjacent regions around the 255-level region are designated as the flare regions, so that two corrected point spread functions are applied.

Through the above scheme, the flare may be removed, but the satisfaction of removing the flare may not be maximized.

Figure 15:
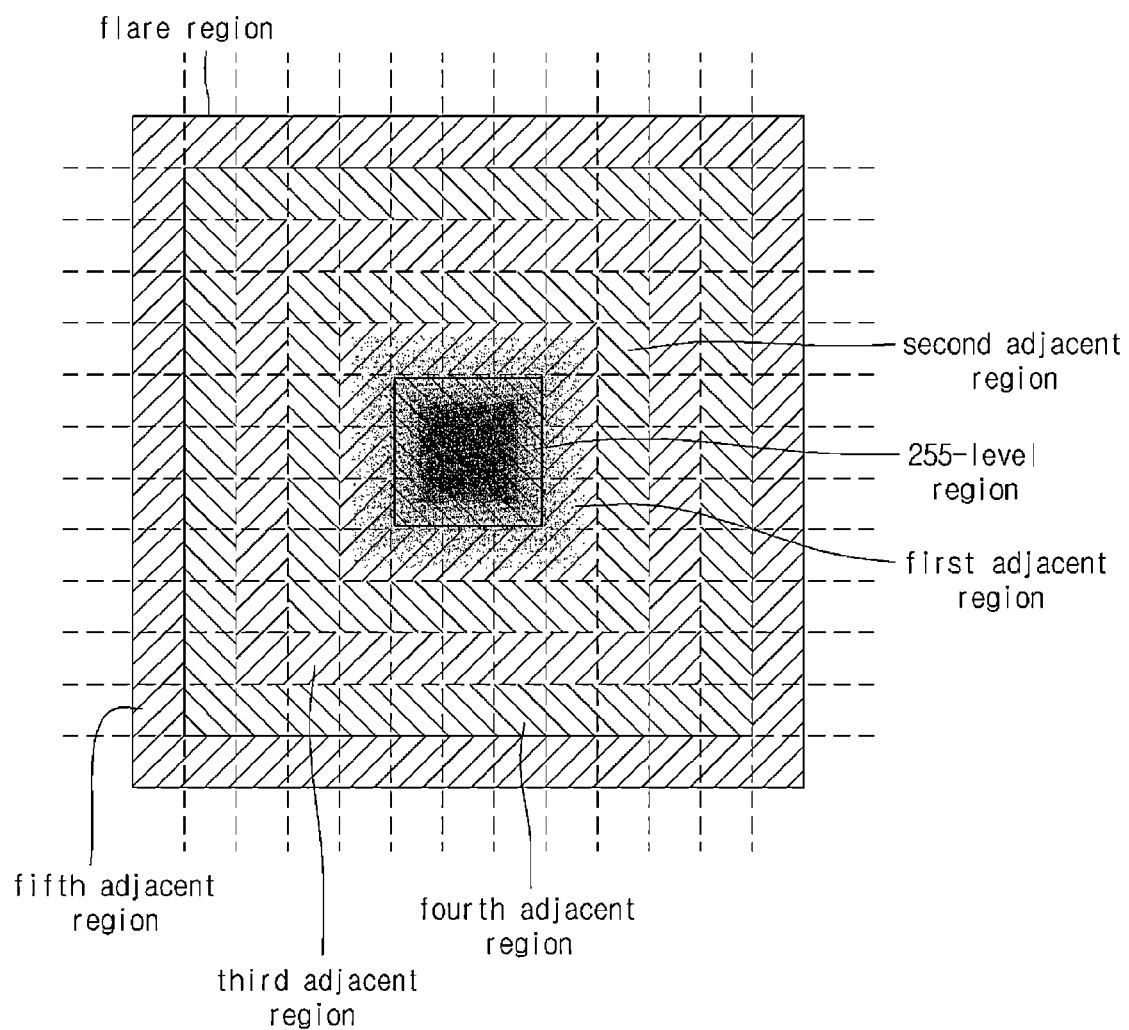

Therefore, according to the embodiment, as shown in FIG. 15, if the flare region is specified, the region dividing unit 131 sub-divides the specified flare region.

In other words, although only two adjacent regions are designated as the flare region according to the related art, the region dividing unit 131 sub-divides the two regions into five regions, so that the five adjacent regions are included in the flare region.

Accordingly, corrected point spread functions for the five adjacent regions are calculated, and the inverse functions of the corrected point spread functions are calculated so that the original image may be reconstructed.

In other words, a first corrected point spread function is applied to a first adjacent region closes to the 255-level region, and a second corrected point spread function is applied to a second adjacent region secondarily closer to the 255-level region. A third corrected point spread function is applied to a third adjacent region that is third closer to the 255-level region, a fourth corrected point spread function is applied to a fourth adjacent region that is fourthly closer to the 255-level region, and a fifth corrected point spread function is applied to a fifth adjacent region that is fifthly closer to the 255-level region.

In this case, the relations of the first to fifth corrected point spread functions are reduced as a predetermined adjacent region is away from the 255-level region. The corrected point spread function applied to the region farthest away from the 255-level region is substantially the same as the reference point spread function.

Figure 16:
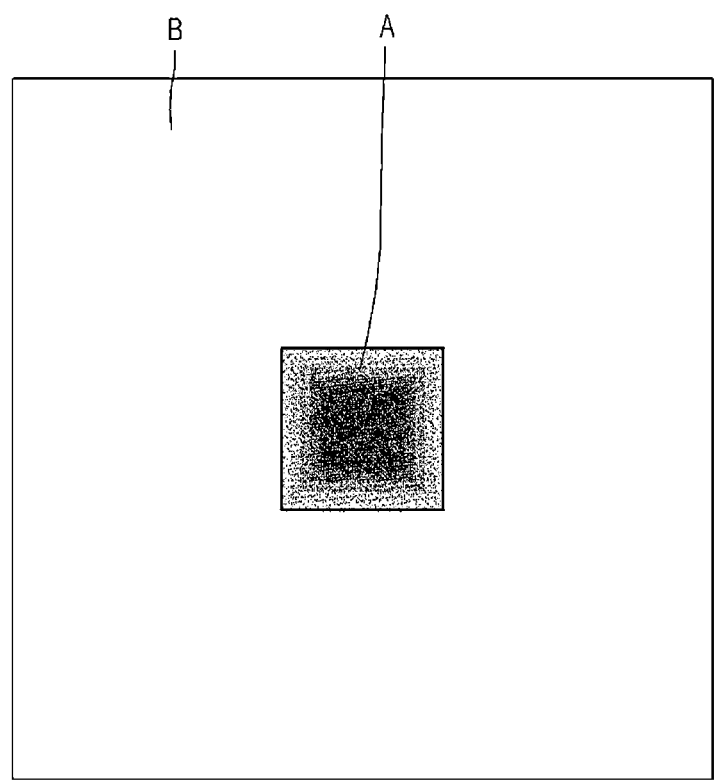
FIG. 16 is a view showing an image output according to the first and second embodiments.

If the convolution is performed by applying the corrected point spread function, the region of an object such as a light source actually remains, and only the flare around the region of the object may be removed as shown in FIG. 16.

In addition, since the reference point spread function is applied to regions other than the flare region, the image quality of the regions can be inhibited from being degraded.

As described above, according to the embodiment, regions having flare are detected by analyzing images, and different point spread functions are applied to the regions having the flare to remove the flare from the regions, so that the original image can be easily reconstructed without degrading the image quality.

Figure 17:
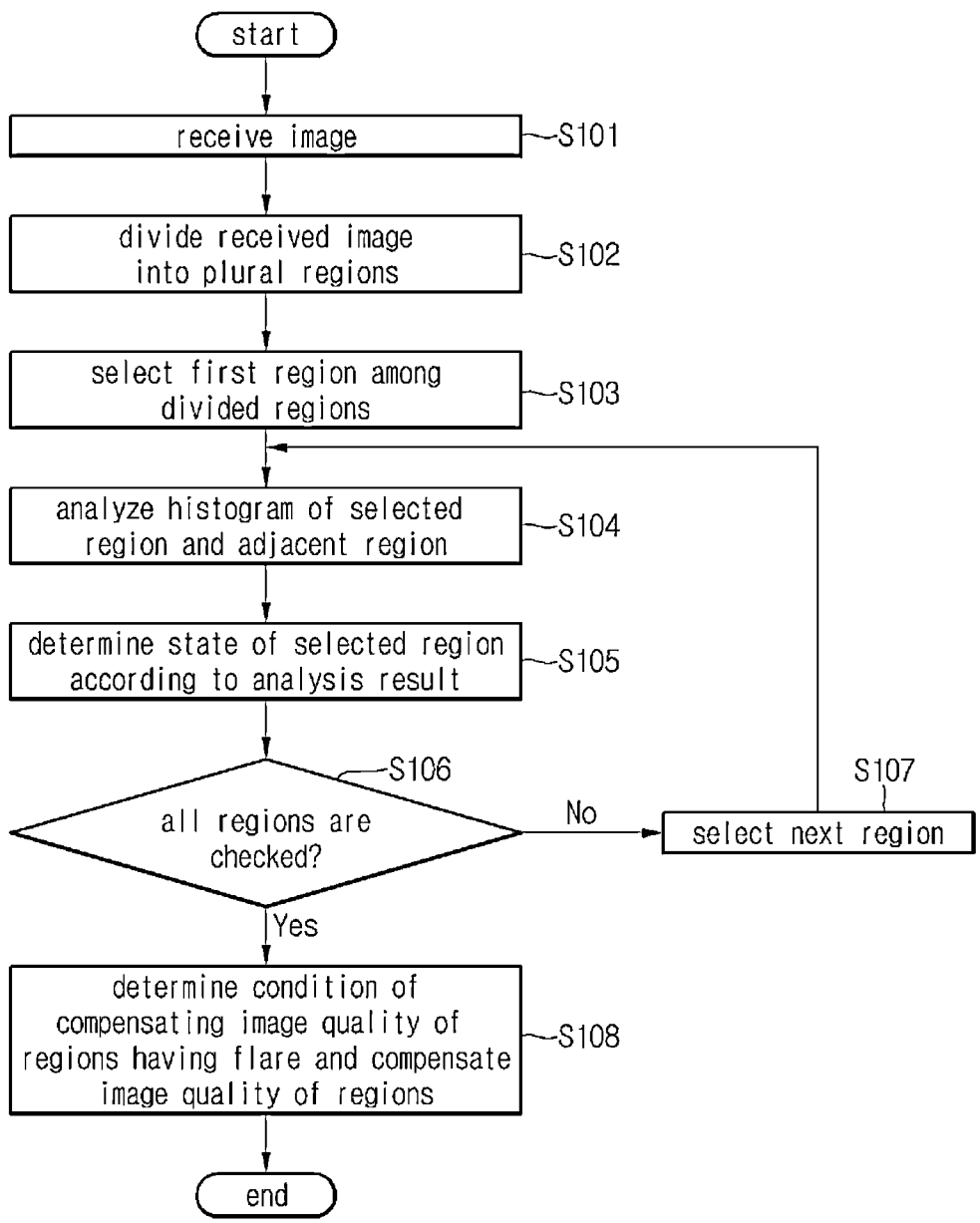
FIG. 17 is a flowchart showing an image processing method of an image processing apparatus of the first embodiment according to steps.

FIG. 17 is a flowchart showing an image processing method of an image processing apparatus of the first embodiment according to steps.

Referring to FIG. 17, the region dividing unit 131 receives an image output through the image sensor 120 (step 101).

Thereafter, the region dividing unit 131 divides the received image in the unit of a frame, and divides the frame-unit image into a plurality of regions (step 102).

A first region (specific region) among the divided regions is checked in order to determine if the first region is the flare region (step S103).

The histogram analyzing unit 132 analyzes the histogram of the first region and a region adjacent to the first region (step S104).

Subsequently, the flare region detecting unit 133 determines if the first region is the flare region by using the histogram of the first region and the adjacent region analyzed through the histogram analyzing unit 132, and determines the position of the first region in the whole flare regions if the first region is the flare region (step S105).

The flare region detecting unit 133 determines if the check process is performed with respect to all regions divided through the region dividing unit 131 (step S106).

According to the determination result, if regions, which are not checked, exist, a next region is selected (step S105), and the above processes (step S104 to step S105) are performed with respect to the next region.

Thereafter, if the flare region is determined, the condition of compensating image quality is determined with respect to an edge region of the whole flare regions, and the image quality is compensated with respect to the edge region by using the determined condition of compensating the image quality (step S108).

Figure 18:
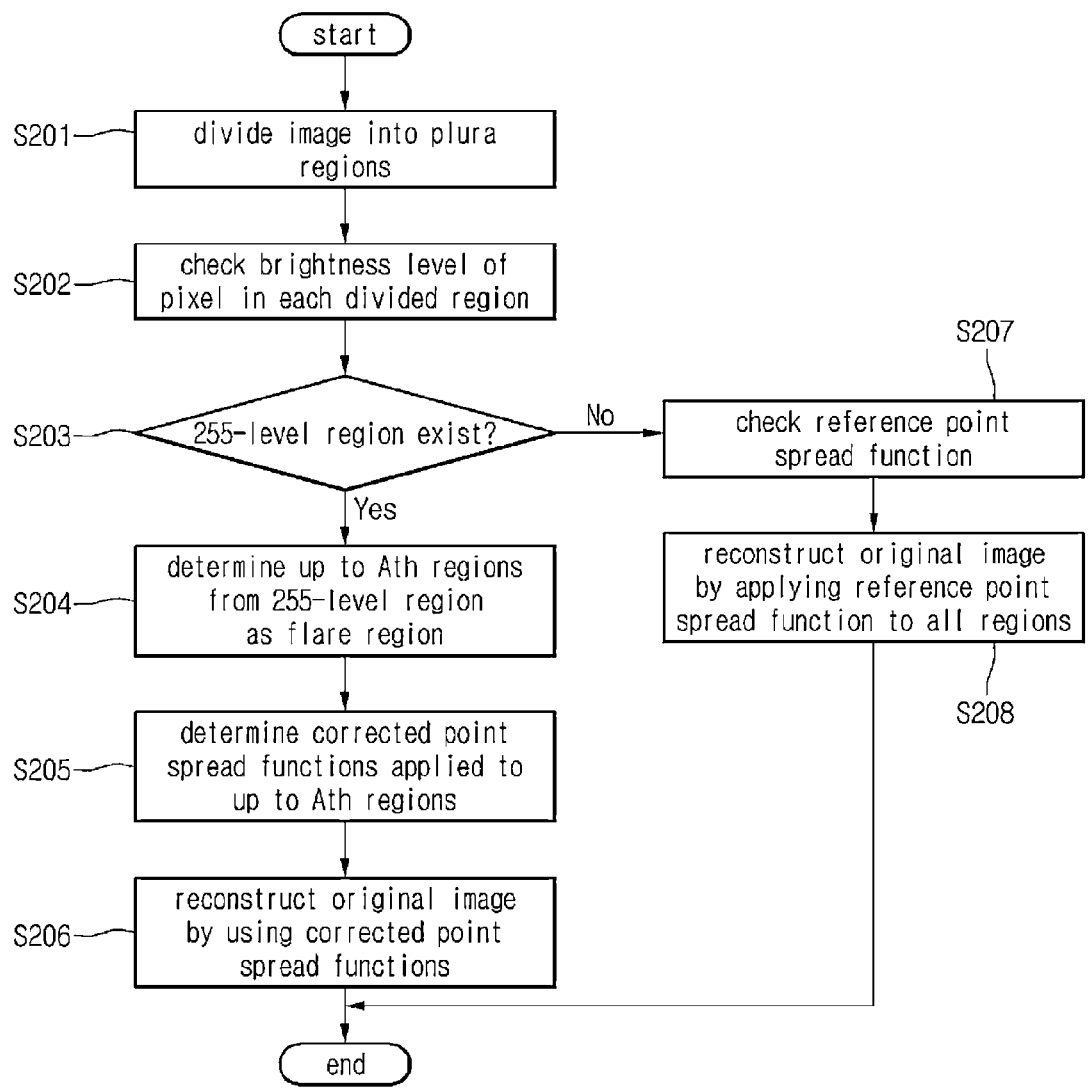
FIGS. 18 and 19 are flowcharts showing an image processing method of an image processing apparatus of the second embodiment according to steps.
Figure 19:
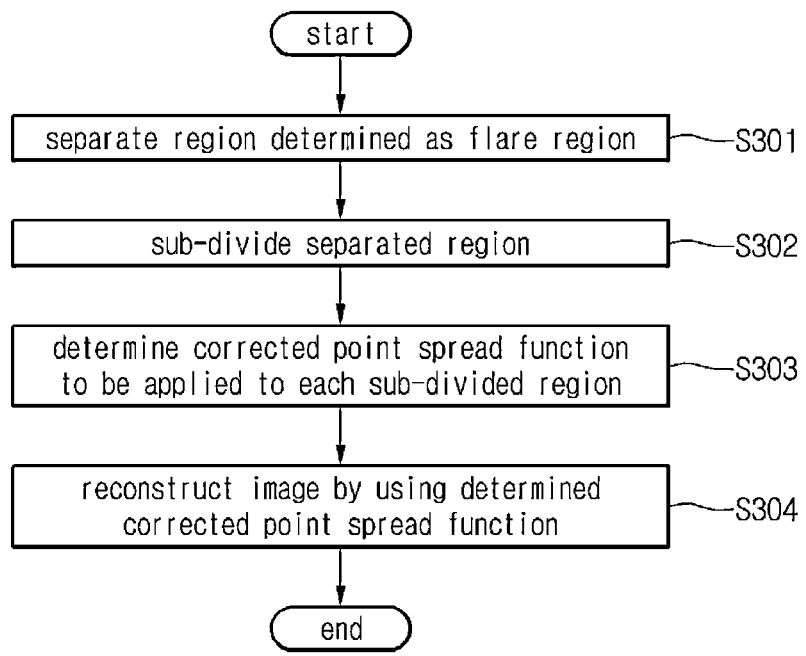

FIGS. 18 and 19 are flowcharts showing an image processing method of an image processing apparatus of the second embodiment according to steps.

Referring to FIG. 18, if an image is received, the received image is divided into a plurality of regions (step S201).

Thereafter, the brightness level for each pixel is checked with respect to each divided region (step S202).

If the brightness level for each pixel is determined, the existence of the 255-level region among the divided regions is determined (step S203).

In other words, determination is made regarding the existence of a region, in which the number of pixels representing the brightness of the level of 255 in the region is equal to or greater than a preset reference value.

If the 255-level region exists, up to Ath regions from the 255-level region are designated as adjacent regions (step S204).

Thereafter, corrected point spread functions to be applied to the designated adjacent regions are determined (step S205). Since the scheme of determining the corrected point spread functions has been already described, the details thereof will be omitted.

If the corrected point spread functions are determined, the reconstruction process for each region of the image is performed by using the determined corrected point spread function and the reference point spread function (step S206).

Meanwhile, if the 255-level region does not exist, a determination that the sensor saturation does not occur is made, and the reference point spread function is checked (step S207).

Thereafter, the checked reference point spread function is applied to all regions of the image, thereby reconstructing the original image (step S208).

Subsequently, referring to FIG. 19, if the flare region is determined, the determined flare region is separately divided (step S301).

Therefore, the separated flare region is more finely divided as compared with the division based on the previous division condition, so that the flare region may be sub-divided into more many regions (step S302).

Subsequently, corrected point spread functions to be applied to adjacent regions, which are sub-divided, are determined (step S303).

Thereafter, the original image is reconstructed by using the determined corrected point spread functions (step S304).

According to the embodiment, regions having flare are detected by analyzing an image, so that the flare is removed by applying different point spread functions to the regions having the flare, thereby easily reconstructing the original image without degrading the image quality of the image.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image processing method of an image processing apparatus, the image processing method comprising:
   receiving an image;
   dividing the received image into a plurality of regions in a unit of a frame;
   acquiring information of brightness of a pixel included in each divided region;
   detecting a region having a flare among the divided regions by using the acquired brightness information;
   determining an image processing condition to be applied to the detected region having the flare; and
   processing the received image based on the determined image processing condition,
   wherein the image processing condition applied to the region having the flare is different from an image processing condition applied to other regions; and
   wherein the detecting of the region having the flare comprises:
   detecting an original region satisfying a first condition;
   determining if a part of adjacent regions of the original region satisfies the first condition and if a remaining part of the adjacent regions of the original region satisfies a second condition opposite to the first condition; and
   detecting the original region as a flare region according to a result of the determination.

2. The image processing method of claim 1, wherein the brightness information includes a brightness value of a pixel representing a highest brightness level in each region, and a number of pixels having a level of 255 in each region.

3. The image processing method of claim 2,
   wherein the first condition represents that the number of the pixels having the level of 255 in each region exceeds a preset reference value, and
   the second condition represents that the number of the pixels having the level of 255 in each region is less than that preset reference value.

4. The image processing method of claim 1, wherein the determining of the image processing condition comprises determining at least one of a gamma curve, a gain, and an offset applied to the detected region having the flare.

5. The image processing method of claim 4, wherein the applied gamma curve has a gradient reduced according a flare degree of the region having the flare, and the flare degree is determined based on a number of pixels having, a level of 255 in the region having the flare.

6. The image processing method of claim 1, wherein the detecting of the region having the flare comprises:
   confirming a first region among the divided regions by using the acquired brightness information, in which a number of pixels having a level of 255 in the first region exceeds a preset reference value; and
   detecting an adjacent region of the confirmed first region as the region having the flare.

7. The image processing method of claim 6, wherein the determining of the image processing condition comprises:
   obtaining a reference point spread function from a lens; and
   calculating a corrected point spread function to be applied to the region having the flare by using the reference point spread function, and
   wherein the corrected point spread function is applied to the detected region having the flare, and
   the reference point spread function is applied to other regions.

8. The image processing method of claim 7, wherein the region having the flare includes a first adjacent region, which is firstly adjacent to the first region, to an Nth adjacent region, which is located at an Nth adjacent position from the first region, and the corrected point spread functions applied to the first to Nth adjacent regions are different from each other.

9. An image processing apparatus comprising:
   a lens;
   an image sensor to convert a light input through the lens into an electrical image; and
   an image processing unit to divide the converted image through the image sensor into a plurality of regions, to detect a flare region from the divided regions by using brightness information of each divided region, and to perform image processing with respect to the flare region and other regions by applying different image processing conditions to the flare region and the other regions;
   wherein the image processing unit comprises:
   a region dividing unit receiving the converted image, and dividing the received image into the regions in a unit of a frame; and
   a flare region detecting unit that detects a region satisfying a first condition among the divided regions, determines if a part of adjacent regions of the detected region satisfies the first condition and if a remaining part of the adjacent regions of the detected region satisfies a second condition opposite to the first condition, and determines the detected region as the flare region if the adjacent regions satisfy both the first condition and the second condition.

10. The image processing apparatus of claim 9, image processing unit further comprising:
    a histogram analyzing unit to acquire the brightness information of each of the regions divided through the region dividing unit; and
    an image quality compensating unit to determine the image processing condition to be applied to the detected flare region and perform the image processing with respect to the flare region according to the determined image processing condition;
    wherein the flare region detecting unit detects the flare region among the divided regions by using the brightness information.

11. The image processing apparatus of claim 10,
    wherein the first condition represents that a number of pixels having a level of 255 among pixels included in each region exceeds a preset reference value, and the second condition represents that the number of the pixels having the level of 255 among the pixels included in each region is less than the preset reference value.

12. The image processing apparatus of claim 11, wherein the image processing condition includes at least one of a gamma curve, a gain, and an offset applied to the detected flare region.

13. The image processing apparatus of claim 12, wherein the applied gamma curve has a gradient reduced according a flare degree of the flare region, and the flare degree is determined based on the number of the pixels having the level of 255 and included in the flare region.

14. The image processing apparatus of claim 10, wherein the flare region detecting unit confirms a first region among the divided regions by using the acquired brightness information, in which a number of pixels having a level of 255 in the first region exceeds a preset reference value and detects an adjacent region of the confirmed first region as the flare region.

15. The image processing apparatus of claim 14, further comprising a control unit to obtain a reference point spread function from the lens and to calculate a corrected point spread function to be applied to the flare region by using the reference point spread function.

16. The image processing apparatus of claim 15, wherein the control unit applies the corrected point spread function to the detected flare region, and applies the reference point spread function to other regions.

17. The image processing apparatus of claim 16, wherein the control unit calculates a corrected point spread function to be applied to each adjacent region designated as the flare region based on a degree of proximity relative to the first region.

18. The image processing apparatus of claim 17, wherein the adjacent region designated as the flare region includes a first adjacent region, which is firstly adjacent to the first region, to an Nth adjacent region, which is located at an Nth adjacent position from the first region, and corrected spread functions applied to the first to Nth adjacent regions are different from each other.

19. The image processing apparatus of claim 18, wherein the image quality compensating unit performs a convolution by using the corrected point spread function calculated with respect to each adjacent region and the reference point spread function.

20. The image processing apparatus of claim 17, wherein the region dividing unit re-divides the flare region into sub-division regions if the flare region is detected, and the control unit calculates corrected point spread functions to be applied to the sub-division regions.

* * * * *